R. S. BRYANT.
RIM FOR VEHICLE WHEELS.
APPLICATION FILED SEPT. 2, 1913.

1,216,279.

Patented Feb. 20, 1917.
2 SHEETS—SHEET 1.

WITNESSES:
R. L. Bruck.
R. E. Caspell.

INVENTOR.
Richard S. Bryant
By Hull & Smith
ATTYS.

UNITED STATES PATENT OFFICE.

RICHARD S. BRYANT, OF CLEVELAND, OHIO, ASSIGNOR TO THE STANDARD WELDING COMPANY, OF CLEVELAND, OHIO, A CORPORATION OF OHIO.

RIM FOR VEHICLE-WHEELS.

1,216,279.     Specification of Letters Patent.     Patented Feb. 20, 1917.

Application filed September 2, 1913. Serial No. 787,784.

*To all whom it may concern:*

Be it known that I, RICHARD S. BRYANT, a citizen of the United States, residing at Cleveland, in the county of Cuyahoga and State of Ohio, have invented a certain new and useful Improvement in Rims for Vehicle-Wheels, of which the following is a full, clear, and exact description, reference being had to the accompanying drawings.

This invention relates to vehicle wheels and has for its general object the provision of an improved form of rim whereby the removal, repair, and replacement of a pneumatic tire may be facilitated without impairing the reliability of the construction or rendering the same either ponderous or complicated. The liability of pneumatic tires to puncture and other accidents renders it necessary that the tire be easily removable from the rim upon which it is carried and yet be securely attached to said rim under all conditions of use.

Accordingly the objects of this invention are the provision of new and improved means for securing together the ends of the middle or base ring and for holding the side rings firmly thereto; the provision of a ring which shall be safe against being disassembled prior to the deflation of the tire; the provision of a construction in which all of the parts can be made by cold rolling metal and without appreciably changing the thickness of any of the parts thereof; the provision of a ring of great lightness, simplicity, cheapness and ease of operation; while further objects and advantages of the invention will become apparent as the description proceeds.

Figure 1:
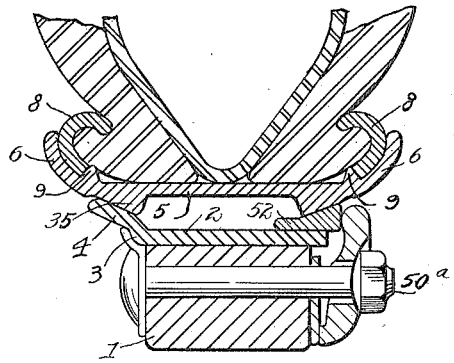
Figure 2:
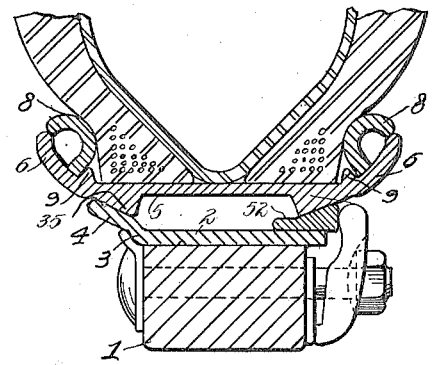
Figure 3:
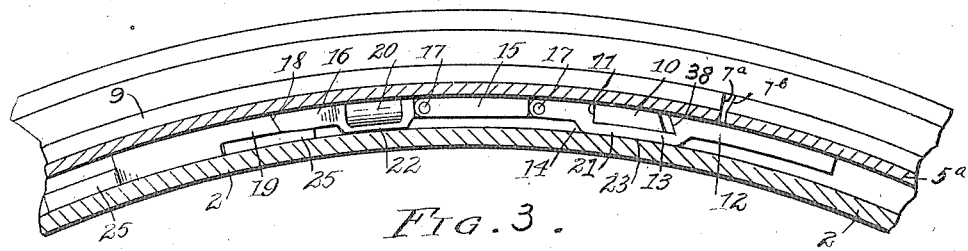
Figure 4:
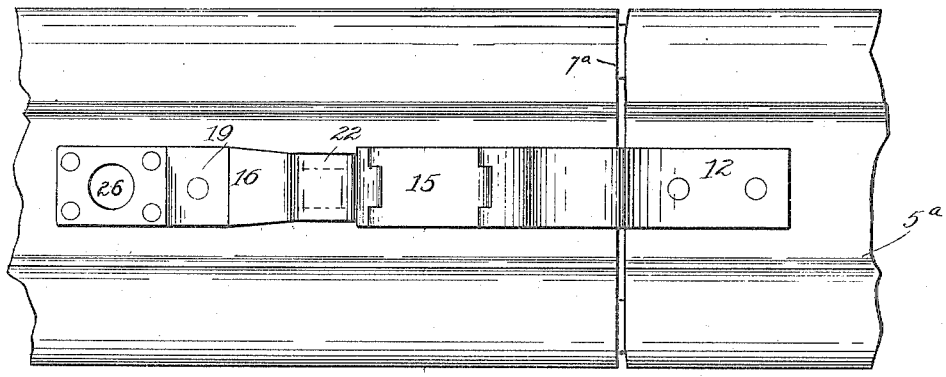
Figure 5:
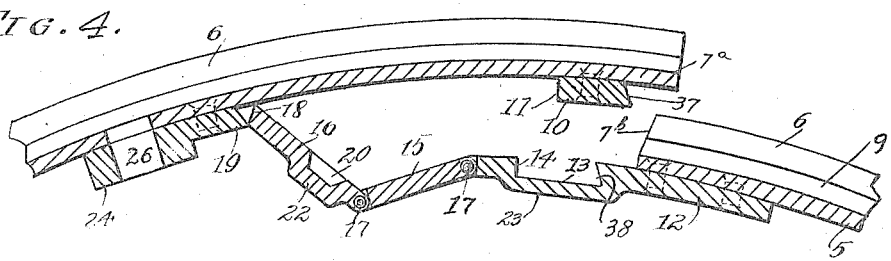
Figure 6:
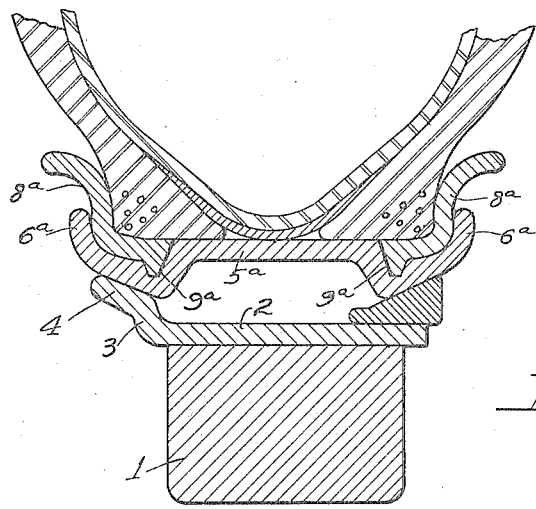
Figure 7:
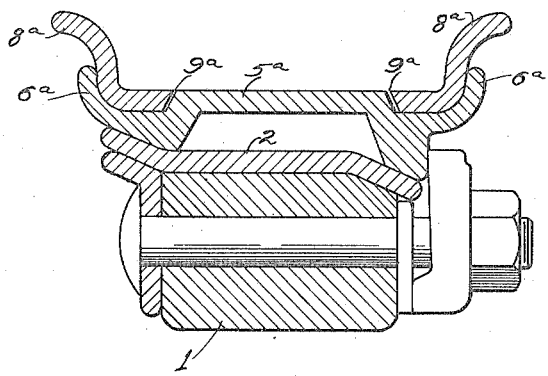
Figure 8:
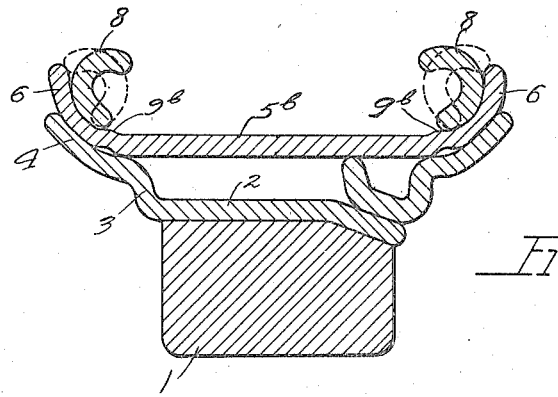

Generally speaking, my invention may be defined as consisting of the constructions and combinations illustrated in the drawings accompanying and forming part of this application, in which; Figure 1 is a transverse, cross-sectional view of a felly, rim, and tire, the rim being constructed in accordance with my invention and the line of section passing through one of the securing bolts together with its clip which is shown in operative position; Fig. 2 is a similar view showing the same rim and felly with the rim flanges or side rings in reversed position for the reception of a tire of different type, the line of section passing at one side of the bolt and clip; Fig. 3 is a longitudinal, cross-sectional view of a portion of one of the foregoing rings together with its felly band, illustrating the method of securing together the ends of the middle or base ring; Fig. 4 is an inside view of the portion of the rim shown in Fig. 3; Fig. 5 is a longitudinal, cross-sectional view of a portion of the base ring shown in Fig. 4, illustrating the ends thereof in disengaged position; and Figs. 6, 7, and 8 are transverse, cross-sectional views of modified forms of rims constructed in accordance with my invention.

Describing the parts by reference characters, 1 represents the felly of a vehicle wheel of the usual or any suitable construction and formed of wood or any other desirable material. In these drawings I have illustrated the felly as surrounded by a metallic felly band 2 having at one of its edges the outwardly turned flange 3, terminating in the outwardly flared ledge 4, the opposite edge of the felly band being plain and uninterrupted. It will be understood, however, that the particular construction of the wheel has no bearing upon this invention, wherefore the felly and felly band could be made all in one piece or either could be omitted entirely so long as a proper seating member is provided for the reception of my rim. Accordingly I have hereafter denoted these parts generally by the term "circular member."

My improved rim comprises generally a transversely split metallic annular base, constituting the rim proper, and a pair of continuous side rings or flanges, said side rings being formed for engagement with the clenches or side walls of the tire and the split middle ring with the mid-portion of the tire, said middle ring being also formed with securing means whereby its abutting ends may be secured rigidly together. The rim base comprises a cylindrical portion 5 having outwardly turned flanges 6—6 equally spaced from its median line, the whole being bent into substantially circular form and having closely abutting ends 7. Surrounding said rim base adjacent to each of the flanges 6—6 is an endless ring 8 which I here term a side ring or flange, the same having one of its sides formed to engage the adjacent flange 6, and having its opposite side conforming to the shape of the tire to be used therewith. In the embodiment illustrated in Figs. 1, 2, and 8 the side rings 8, 8 are convex on one side and concave on the other so that when turned with their concave sides facing each other, they will receive the ordinary clencher tire and when reversed as illustrated in Fig. 2, they will receive a straight wall tire. Also in this construction, the height of the flanges 6 and the curvature of the rings is preferably such that upon the reversal of the latter, the margins of these members will touch each other as illustrated in Fig. 2 so as both to increase the strength of the construction and to prevent the formation of a slot or groove which otherwise would collect water and sand.

In the embodiment illustrated in Figs. 1 and 2, the location of the side rings 8—8 is definitely fixed by means of annular ribs 9—9 formed upon the outer surface of the rim base 5 adjacent to the flanges 6—6. In the embodiment illustrated in Figs. 6 and 7, the base $5^a$ is formed adjacent each of its lateral edges with an annular groove $9^a$ having at its outer edge an upturned lip $6^a$ extending outwardly preferably a greater distance that the surface of the ring $5^a$. The side rings are illustrated at $8^a$—$8^a$ and are continuous as before, but in this embodiment are formed with cylindrical inner portions adapted to fit within the groove $9^a$ with their surfaces substantially flush with the surface of the middle or base ring and having their outer edges bent outwardly to form annular tire receiving flanges, the shape of such flanges being entirely dependent upon the shape of the tire to be employed therewith. In the embodiment illustrated in Fig. 8, the rim $5^b$ is everywhere of substantially uniform thickness and made by cold rolling ordinary flat sheet steel. The portions of this rim within and adjacent to the flanges 6—6 are illustrated as swelled outwardly as at $9^b$ to form a substantially cylindrical shelf for the reception of the side rings. These shelves are not essential to the performance of my invention but are of practical importance in the provision of a rim in which the side flanges can be reversed, since if the side rings are forced to seat upon the cylindrical surface of the rim base, they will necessarily be of too great height and too great curvature to permit of their being reversed so as to receive tires of standard shape and sizes.

Claims to the specific construction of the side rings or flanges shown in Figs. 1 and 2, and in said last named Fig. 8, have been divided out of this case and will be found in my co-pending application filed October 30, 1913, Serial No. 798,175.

One end of the base ring 5 is preferably made square as shown at $7^a$ in Fig. 7, and the opposite end is preferably beveled outwardly as illustrated at $7^b$. It is also desirable that means be provided for securing rigidly together the ends of this ring so as to prevent either the expansion or contraction thereof, and to this end I employ that illustrated in Figs. 3, 4, and 5. In this arrangement the interior of the rim base is provided near to the squared end $7^a$ with a block 10, rigidly secured in place as by riveting or welding, and having an abrupt engaging shoulder 11 at the side opposite the rim-end. Secured to the opposite end $7^b$ of the rim and projecting beyond such end is a rigid metallic tongue 12 firmly secured thereto as by riveting or welding and having a notch or recess 13 adapted for the reception of the block 10, one end of the notch or recess being formed with an abutment shoulder 14 adapted to engage snugly the shoulder 11 of that block. The parts are so fashioned that when this engagement takes place only sufficient clearance is left between the ends $7^a$ and $7^b$ for purposes of convenient operation. Pivoted to the end of the tongue 12 upon a transverse axis is a link 15, and pivoted in turn to the end of the link 15 upon a parallel axis is a second link 16, the links 15 and 16 forming a toggle-joint as shown in Fig. 7. The pins 17—17 by which the links 15 and 16 are pivoted together and to the tongue 12 are of less size than the apertures in which they are placed, as indicated in Fig. 5, so that said links may abut directly together when the toggle is straightened, thus avoiding any shearing strain upon the pins.

The forward end of the link 16 is inclined, as shown at 18 for engagement with the similarly undercut face of a block 19 secured to the inner face of the base 5, a short distance from block 10. The distance between the block 19 and block 10 is such that when the links conform to the arc of the circle defined by the ring (see Fig. 3) the shoulders 14 and 18 just closely engage the faces of the blocks 10 and 19. Owing to the fact that the links 15 and 16 form a toggle joint it will be seen that a large amount of force is developed thereby which will expand the transversely split base into snug engagement with the side rings with a minimum of effort on the part of the operator. In fact the customary procedure is for the operator to press this toggle into place with his foot while holding the side rings and tire in place with his hands. Also it will be seen that a considerable amount of pull will be necessary to displace them from the position shown in Figs. 3 and 4. In order to permit the application of this necessary force to the parts, one of the links, as 16, is formed with an undercut, tool-receiving recess 20; the tongue may also if desired be formed with a tool-receiving recess 21.

A portion of at least one of the links, such as the portion immediately above the tool-receiving recess 20, is thickened as illustrated at 22 so as to fit snugly against the face of the felly band 2 when the rim is located upon the wheel. Similarly the thickness of the tongue 13 may be adjusted at the point 23 as illustrated in Fig. 5. This arrangement absolutely prevents the parts from becoming disengaged while mounted upon the wheel in operative position. Any suitable interfitting means may be employed for preventing slipping or creeping between the rim and the felly band. In the present embodiment the block 19 is illustrated as formed with a thickened portion 24 forming a driving block and adapted to fit between fixed lugs 25—25 carried by the felly band. Also any suitable or convenient part of the rim may be formed for the reception of the valve stem; in the present embodiment the driving block 24 is apertured for the valve stem as illustrated at 26.

It will be seen that this construction secures the middle section or base of the rim rigidly against either expansion or contraction despite its transversely split character which I esteem to be highly important for the following reasons. When the rim is surrounded by an inflated tire, it is obvious that a forcible inward pressure is exerted upon the trans-split base tending to collapse the same. This pressure might, of course, be withstood to some degree by the abutment of the square faces of the ring ends, although it might not be desirable to rely wholly upon this abutment for securing the ring ends together when the rim and its tire are being carried on the running board. Moreover when the rim is mounted upon the wheel, it is generally held in place, according to standard practice, by means of wedges of some kind forced beneath one side thereof and by virtue of resting upon the inclined ledge 4 at the other side. Accordingly at this time the inward pressure of the tire is opposed by the expanding effect of the wedge means, and this might cause the tightness of the rim upon the felly to depend entirely upon the inflation of the tire, since a careless mechanic might not set up the nut 24 sufficiently to expand the ring 5 against this pressure. In this case, a decrease of the tire pressure might cause the rim to become loose with disastrous results.

Furthermore it is desirable to employ some means for expanding said rim into engagement with said side rings when the parts are assembled so as to hold them securely in position and to prevent said side rings from twisting about and throwing the wheel out of true. Also this securing expedient must be such as can be operated without the use of complicated tools, have no detachable parts, must be simple and reliable, must be of such compactness as to be received in the space between the middle ring and the circular member. In addition it is highly important that this securing means be of such a nature as not to become accidentally disengaged while the tire and rim are mounted upon the running board of the vehicle, or such as can be disengaged by a careless or absent minded operator prior to the deflation of the tire.

As to the danger that an ignorant or careless operator might release the toggle joint prior to deflating the tire and thus become injured by the flying side rings, I have found that with the shape and relative sizes of parts herein illustrated the breaking of the toggle joint is extremely difficult when the tire is inflated and requires a great deal of force. Then, even if the toggle be broken, the pressure merely constricts the base ring and one end of the same has to be pried over the other end before the rings can be released. However, if it be desired to make the device absolutely fool-proof it is merely necessary to undercut the end of the block 10 as shown at 37 and similarly undercut the end of the recess 13 as shown at 38. The smallest length of the recess is greater than the greatest length of the block so that these undercut portions are normally spaced apart as shown in Fig. 5 and have no effect upon the normal operation of the device. If the toggle should accidentally, or ignorantly or thoughtlessly be broken before deflating the tire these undercut ends would be forced together and further action of any kind prevented until the deflation of the tire.

This expedient may be employed or omitted without regard to the rest of my invention, and will frequently be omitted by reason of the desirability of maintaining the ends of the base ring as close together as possible. However an overhang of the faces 37 and 38 of 1/64th of an inch is ample for purposes of this safeguard.

While I have described in detail the construction which my experience indicates to be most satisfactory it will be obvious that certain of the advantages of my invention could be attained with the use of other constructions. Accordingly I do not restrict myself to the details of construction and arrangement illustrated herein except as the same are specifically recited in the claims hereto annexed or rendered necessary by the state of the prior art.

Having thus described my invention, what I claim is:—

1. The combination with a transversely split tire-supporting rim; of a tongue projecting beyond one end of said rim and having a recess; a projection on the other end of said rim adapted to engage such recess when said rim-ends are in alinement; and means adapted to force said rim-ends thus into alinement, said means including a link pivotally connected with said first-named rim-end, a second link similarly connected to said first link and therewith forming a toggle, and an abutment on the other rim-end adapted to coöperate with said second link.

2. The combination with a transversely split tire-supporting rim; of a tongue projecting beyond one end of said rim and having a recess; a projection on the other end of said rim adapted to engage such recess when said rim-ends are in alinement; and means adapted to force said rim-ends thus into alinement, said means including a link pivoted to the end of said tongue, a second link pivoted to said first link and therewith forming a toggle, and an abutment on the other rim-end adapted to coöperate with said second link.

3. The combination with a transversely split tire-supporting rim; of a tongue projecting beyond one end of said rim and having a recess; two longitudinally spaced projections on the other end of said rim, the first of said projections being adapted to engage the recess in said tongue; a link pivoted to the end of said tongue; and a second link pivoted to the free end of said first link and forming therewith a toggle, said second link being adapted to abut with its free end against said second projection.

4. The combination with a transversely split tire-supporting rim; of a tongue projecting beyond one end of said rim and having a recess; two longitudinally spaced projections on the other end of said rim, the first of said projections being adapted to engage the recess in said tongue; a link pivoted to the end of said tongue; and a second link pivoted to the free end of said first link and forming therewith a toggle, said second link being adapted to abut with its free end against said second projection, the pivotal axis of said toggle lying between the opposed faces of said projections.

5. The combination with a transversely split tire-supporting rim; of means adapted to forcefully expand said rim so as to bring the ends thereof into alinement; and undercut devices carried by the ends of said rim, said devices being normally out of engagement but being adapted upon release of said expanding means to interengage and prevent collapsing of such rim prior to deflation of the tire.

6. The combination with a transversely split tire-supporting rim; of an abutment near one end of said rim; toggle means on the other end of said rim adapted to coöperate with said abutment to forcefully expand said rim, so as to bring the ends thereof into alinement; and undercut devices carried by the ends of said rim, said devices being normally out of engagement but being adapted upon release of said expanding means to interengage, due to the contractive effect of the tire, and prevent collapsing of said rim prior to deflation of such tire.

7. The combination with a transversely split rim; of continuous tire-retaining flanges, said rim being adapted in expanded condition to inter-engage with said flanges and in contracted condition to release the same; a tongue projecting beyond one end of said rim and having a recess; a projection on the other end of said rim adapted to engage such recess in said rim's expanded condition; and means adapted thus to expand said rim, said means including a link pivotally connected with said first-named rim-end, a second link similarly connected to said first link and therewith forming a toggle, and an abutment on the other rim-end adapted to coöperate with said second link.

8. The combination with a transversely split rim; of continuous tire-retaining flanges, said rim being adapted in expanded condition to inter-engage with said flanges and in contracted condition to release the same; a tongue projecting beyond one end of said rim and having a recess; a projection on the other end of said rim adapted to engage such recess in said rim's expanded condition; and means adapted thus to expand said rim, said means including a link pivoted to the end of said tongue, a second link pivoted to said first link and therewith forming a toggle, and an abutment on the other rim-end adapted to coöperate with said second link.

9. The combination with a transversely split rim; of continuous tire-retaining flanges, said rim being adapted in expanded condition to inter-engage with said flanges and in contracted condition to release the same; a tongue projecting beyond one end of said rim and having a recess; two longitudinally spaced projections on the other end of said rim, the first of said projections being adapted to engage the recess in said tongue; a link pivoted to the end of said tongue; and a second link pivoted to the free end of said first link and forming therewith a toggle, said second link being adapted to abut with its free end against said second projection, whereby said rim may be expanded by straightening said toggle.

10. The combination with a transversely split rim; of continuous tire-retaining flanges, said rim being adapted in expanded condition to inter-engage with said flanges and in contracted condition to release the same; and means for forcefully expanding said rim including a toggle pivotally connected with one end thereof and adapted to detachably engage the other end thereof.

11. In a pneumatic tired wheel, the combination, with a pair of continuous side rings adapted to engage the sides of the tire and a discontinuous base ring having a middle portion adapted to bridge the space between said side rings and having marginal flanges adapted to engage and secure said side rings, of a fixed block secured to the interior of said base ring adjacent to one of its ends, a link pivoted to the opposite end of said ring upon a transverse axis, and a second link pivoted to the end of the first link upon an axis parallel thereto and making therewith a toggle joint, the end of said last link being formed for interengagement with said block whereby said base ring can be expanded into snug engagement with said side rings.

12. In a pneumatic tired wheel, the combination, with a pair of continuous side rings adapted to engage the sides of the tire, and a discontinuous base ring having a middle portion adapted to bridge the space between said side rings and having marginal flanges adapted to engage and secure said side rings, of a fixed block secured to the interior of said base ring adjacent to one of its ends, a link pivoted to the opposite end of said ring upon a transverse axis, and a second link pivoted to the end of the first link upon an axis parallel thereto and making therewith a toggle joint, the end of said last link being formed for interengagement with said block whereby said base ring can be expanded into snug engagement with said side rings and one of said links being formed for engagement with the wheel-body whereby breaking of the toggle is prevented during the time that the rim is in position upon the wheel.

13. In a pneumatic tired wheel, the combination, with a pair of continuous side rings adapted to engage the sides of the tire, of a discontinuous base ring having a middle portion adapted to bridge the space between said side rings and having outturned marginal flanges adapted to engage and secure said side rings, a fixed block secured to the interior of said base ring adjacent to one of its ends and having an abutment shoulder upon the side away from that end, a tongue rigidly secured to the opposite end of said ring and projecting therebeyond, said tongue having a recess for the reception of said block and also having an abutment shoulder adapted to engage said first shoulder, links pivoted together and to the end of said tongue and forming therewith a toggle joint, and a second block secured to the inner face of said base ring at a distance from said first block and adapted to be engaged by one of said links whereby said ring may be expanded and said shoulders forced into engagement with each other.

14. In a pneumatic tired wheel, the combination, with a pair of continuous side rings adapted to engage the sides of the tire, of a discontinuous base ring having a middle portion adapted to bridge the space between said side rings and having outturned marginal flanges adapted to engage and secure said side rings, of a fixed block secured to the interior of said base ring adjacent to one of its ends, said block having an abutment shoulder upon the side away from that end and an undercut side presented toward that end, a tongue rigidly secured to the opposite end of said ring and projecting therebeyond, said tongue having a recess for the reception of said block one end of which is shouldered similarly to said abutment shoulder and the other end of which is undercut, links pivoted together and to the end of said tongue and forming therewith a toggle joint, and a second block secured to the inner face of said base ring at a distance from said first block and adapted to be engaged by one of said links whereby said ring may be expanded and said shoulders forced into engagement with each other.

15. In a pneumatic tired wheel, the combination with a pair of continuous side rings adapted to engage the sides of the tire, and a discontinuous base-ring having a middle portion adapted to bridge the space between said side rings and having marginal flanges adapted to engage and secure said side rings; of means for expanding said base-ring into secure engagement with said side rings; and other means, normally inoperative, adapted upon releasing said expanding means to prevent the collapsing of said base-ring, prior to deflation of the tire.

16. In a pneumatic tired wheel, the combination, with a pair of continuous side rings adapted to engage the sides of the tire, of a discontinuous base ring having a substantially cylindrical portion adapted to bridge the space between said side rings and having outwardly turned marginal flanges adapted to engage said side rings, means carried by said base ring for expanding the same into snug engagement with the interiors of said side rings, and undercut devices carried by the ends of said base ring adapted to interengage and prevent the collapsing of said ring prior to the deflation of the tire.

17. In a pneumatic tired wheel, the combination, with a pair of continuous side rings adapted to engage the sides of the tire, and a discontinuous base ring having a middle portion adapted to bridge the space between said side rings and having marginal flanges adapted to embrace and secure said side rings, of a fixed block secured to the interior of said base ring adjacent to one of its ends, a link pivoted to the opposite end of said ring upon a transverse axis, and a second link pivoted to the end of the first link upon an axis parallel thereto and making therewith a toggle joint, the end of said last link being formed for interengagement with said block whereby said base ring can be expanded into snug engagement with said side rings and the ends of said base ring being provided with undercut devices adapted to engage each other and prevent the collapsing of the same in case said toggle joint is broken prior to the deflation of the tire.

18. The combination with a transversely split tire-supporting rim; of a tongue projecting beyond one end of said rim and adapted to snap into interlocking engagement with the other rim-end in said rim's expanded condition, so as to prevent relative movement of such ends; and means adapted to force said rim-ends thus into alinement, said means including a link pivotally connected with said first-named rim-end, a second link smiliarly connected to said first link and therewith forming a toggle, and an abutment on the other rim-end adapted to coöperate with said second link.

In testimony whereof, I hereunto affix my signature in the presence of two witnesses.

RICHARD S. BRYANT.

Witnesses:
 BRENNAN B. WEST,
 HAROLD E. SMITH.